United States Patent [19]

Battocletti

[11] 3,912,871

[45] Oct. 14, 1975

[54] METHOD AND APPARATUS FOR IDLE PATH SEARCH IN A TIME DIVISION MULTIPLEXED SWITCHING NETWORK

[75] Inventor: Frank E. Battocletti, Columbus, Ohio

[73] Assignee: North Electric Company, Galion, Ohio

[22] Filed: Dec. 27, 1973

[21] Appl. No.: 428,791

[52] U.S. Cl. ......................... 179/15 AQ; 179/15 AT
[51] Int. Cl.[2] ............................................ H04J 3/00
[58] Field of Search ...... 179/15 AQ, 15 AT, 15 BY, 179/15 A, 15 AL

[56] References Cited

UNITED STATES PATENTS

| | | | |
|---|---|---|---|
| 3,585,306 | 6/1971 | Battocletti et al. | 179/15 AT |
| 3,694,580 | 9/1972 | Inose | 179/15 AQ |
| 3,705,958 | 12/1972 | Jacob | 179/18 J |
| 3,718,769 | 2/1973 | Jacob | 179/18 J |
| 3,740,480 | 6/1973 | Krupp et al. | 179/15 AQ |
| 3,743,789 | 7/1973 | Krupp | 179/15 BY |

*Primary Examiner*—Kathleen H. Claffy
*Assistant Examiner*—Joseph Popek
*Attorney, Agent, or Firm*—Johnson, Dienner, Emrich & Wagner

[57] ABSTRACT

A method and apparatus for selecting time slots on selected lines on a network has particular utility for selecting idle time slots for a signal path between selected input and output highways in a network of highways in a telephone system. In the method a status list of selectable, idle time slots on a selected output highway is successively examined to identify each of the output highway idle time slots. A crosspoint between the highways is then closed during the time slot identified as idle to establish a signal path between the selected highways. Each selectable, idle time slot on only the input highway has an encoded signal or illegal word. If the input highway time slot during which the signal path is established is idle, the illegal word is carried from the input highway through the crosspoint to the output highway. An illegal word detector on the output highway detects the illegal word for selecting the idle time slots.

In the apparatus a memory device successively identifies the busy or idle status of time slots on the selected output highway. A crosspoint closes a signal path between the input and output highways during the output highway time slot identified as idle. An illegal word detector on the output highway looks for an illegal word carried from an idle input highway time slot through the crosspoint to the output highway. When an illegal word is detected, the idle time slot and thus an idle path through the time division multiplexed network has been found.

16 Claims, 2 Drawing Figures

TST NETWORK CONFIGURATION

TST NETWORK CONFIGURATION

CONTROLLER HARDWARE FOR IDLE PATH SEARCH

METHOD AND APPARATUS FOR IDLE PATH SEARCH IN A TIME DIVISION MULTIPLEXED SWITCHING NETWORK

BACKGROUND OF THE INVENTION

This invention relates to a method and apparatus for selecting time slots on lines of a network.

A variety of devices have a network of lines, selected ones of which are interconnected at selected times to carry signals from one line to another. The problem of appropriately interconnecting the lines is increased if the lines are shared in time by several information signals. Time shared lines often have a defined series of signal intervals or frames, each frame being divided into a plurality of sub-intervals or time slots each of which may carry a different signal. The time slots are thus intervals of potential signal carrying time within each frame interval. Usually corresponding time slots in each successive frame carry successive portions of a signal; for example, a third time slot of each frame carries successive portions of one signal. This is called time division multiplexing of the signals. However, it will be convenient to refer hereafter only to time slots within one frame it being understood that corresponding time slots occur in each succeeding frame.

If the signals in individual time slots on one line are to be switched to different lines of the network, the lines must be connected only when the time slot carrying a signal for a desired one of the other lines arrives at a device connecting the lines. But one example of the many such networks is a network of highways in a time-space-time or TST telephone system.

In a known TST telephone system, call signals from several sources are time division multiplexed into time slots on transmission lines. Several of these multiplexed lines are coupled to a time slot interchanger. Each interchanger serves as an input device for one of several input highways of the TST network. Each time slot interchanger has a buffer memory device for receiving the signals from each connected multiplexed line and a control memory device for assinging the signals to time slots on the input highway.

Crosspoints connect each input highway to each of several, similar output highways. Each output highway then carries signals in time slots synchronized with the time slots on the input highway to a time slot interchanger. These time slot interchangers serve as output devices for directing the call signals to discrete time slots on multiplexed output lines to ultimately reach the call destinations.

To maintain call signal integrity, each time slot carries the signal of only one call. It is therefore necessary to select an idle time slot on the input and output highways for each call signal to be newly added to the highways. The selection of the idle time slot is called an idle path search. For this purpose it is known to identify idle highway time slots in the memory device controlling the input highway time slot interchanger and a memory device controlling the crosspoint with an encoded signal. A processor then determines the appropriate highways and connected time slot interchangers for each call and compares successive highway time slots identified in the memory devices to detect corresponding time slots on the highways identified as idle. The processor then assigns these time slots to the new signal and ultimately directs the crosspoint connecting the determined highways to close a signal path between the highways during the time slots.

This known procedure for idle path search undesirably centralizes control of call connections in the processor. In addition, it requires an excessive volume of data signals between the processor and the memory devices to find an idle time slot for the signal path.

SUMMARY OF THE INVENTION

Accordingly it is an object of the invention to provide a method and apparatus for establishing a path between selected lines of a network during selected time slots requiring a minimum of processor control.

To this end the invention provides a method and apparatus for selecting time slots during which a signal path between selected highways of a network is established. A list indicates the selectable status of time slots on an output highway. Time slots on only the input highway are encoded with a signal indicating the selectability of the time slots. In the method the selectable status of time slots on the output highway is identified for establishing a signal carrying path between the highways during the output highway time slots listed as selectable and a time slot on the input highway. If an encoded signal is carried on the path between the highways, the time slots are selected. In the apparatus, a memory device listing the status of the time slots on the output highway directs a crosspoint to close during each time slot listed as selectable for establishing a signal carrying path between the highways. A detector connected to the one line detects an encoded signal carried on the path from the output line for selecting the time slots.

DESCRIPTION OF THE DRAWINGS

A preferred embodiment which illustrates but does not limit the invention will now be described with reference to drawings of the embodiment in which.

DESCRIPTION OF PREFERRED EMBODIMENT

Figure 1:
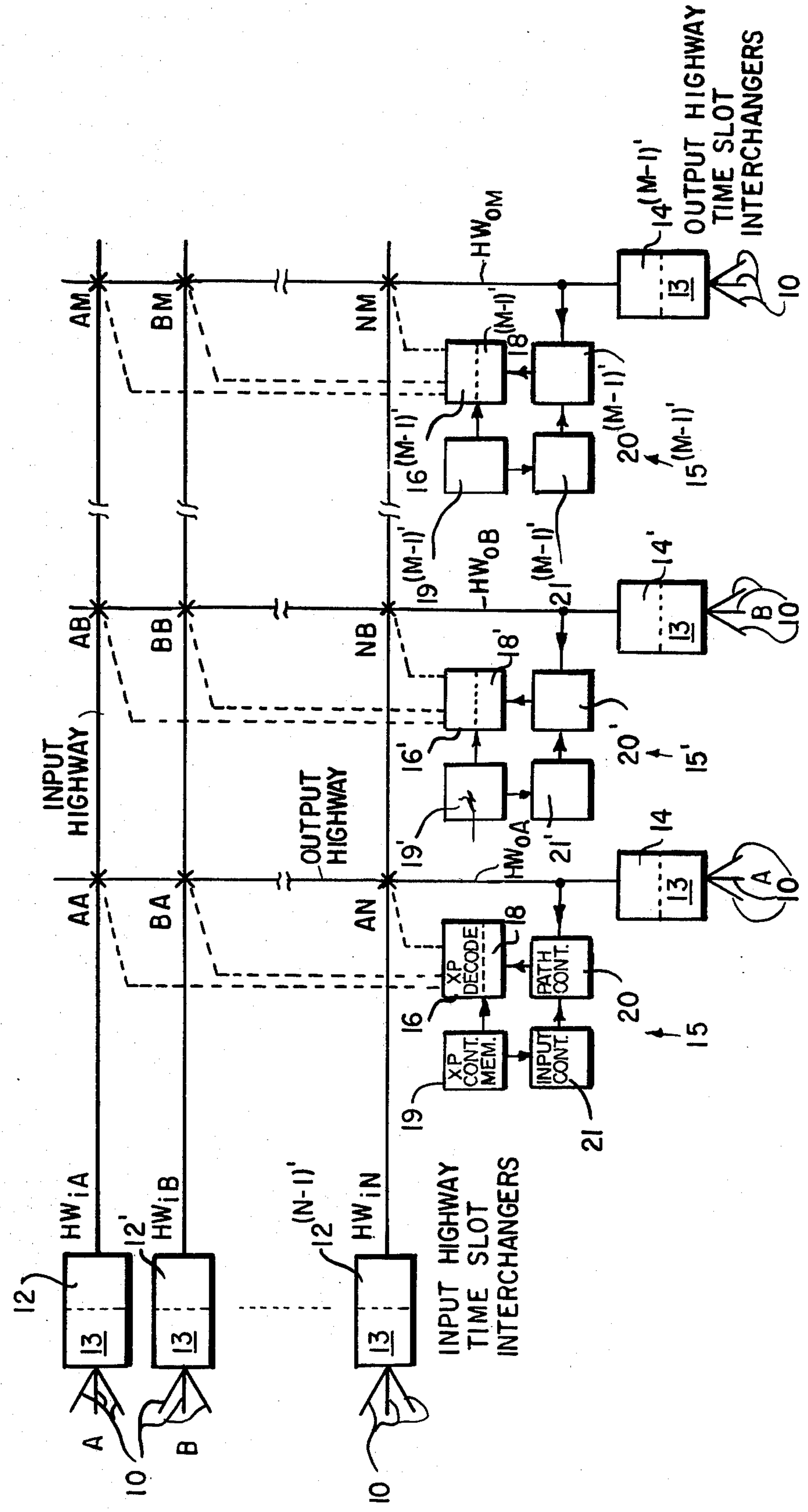
FIG. 1 is a schematic of a telephone system including the embodiment.

FIG. 1 illustrates a TST telephone system including the preferred embodiment of the invention. Telephone call signals are carried in time slots on each of a plurality of lines 10 several of which are connected to each of several, known, similar imput time slot interchangers 12 through $\mathbf{12}^{(N-1)'}$. Each input interchanger has buffer and control memory portions 13 for placing signals received from the lines into time slots on an input highway connected to the input interchanger. The input highways $HW_{iA}$ through $HW_{iN}$ each intersect a plurality of output highways $HW_{oA}$ through $HW_{oM}$ at crosspoints AA through NM. Each crosspoint may be closed at selected times to establish a signal carrying path from a time slot on an input highway to a time slot on an output highway. The output highways carry signals to output time slot interchangers, for example, interchanger 14' connected to the output highway $HW_{oB}$. Each output interchanger also has a memory portion 13 and places the signals in time slots on one of several lines 10 connected to the interchanger for ultimately reaching the called destinations. The described lines, input interchangers, highways, crosspoints and output interchangers are known and therefore require limited further description.

Each column of crosspoints is connected to a set of control devices generally at 15 through $15^{(M-1)'}$, respectively. For example, the column of crosspoints AB to NB is connected to a set of control devices at 15'. Each set of control devices is analogous so that only one need be described.

Then describing the set of devices at 15' selected in the above example, this set is seen to have a device having a decoder portion 16' connected to each crosspoint in the column and a crosspoint controller portion 18'. The decoder portion can close a selected one of the connected crosspoints during a time slot identified through the controller portion to establish a signal carrying path during the time slot between highways connected to the crosspoint.

To identify the selected crosspoints and time slots, the crosspoint controller is connected to a crosspoint control memory device 19' and to a path controller 20'. The crosspoint control memory identifies crosspoints previously selected for closing a signal path at identified time slots. The path controller comprises both crosspoint control devices and path search equipment for selecting a call signal path through a crosspoint and for searching for an idle time slot on the path.

In order to maintain the integrity of call signals, the path controller must select a time slot on each highway not carrying another call signal; such time slots are called idle time slots. For this purpose the path controller is associated with an input control device 21' directing the crosspoint control devices and path search equipment of the path controller 20'. The path controller then directs the associated crosspoint controller 18' and crosspoint decoder 16' to close a path between the selected highways during the selected time slots.

Since the signal within each time slot on an input highway is intended for an output highway, it may be assumed by way of example that one call signal on highway $HW_{iA}$ is intended for highway $HW_{oB}$. The path to be followed by this signal is then from input interchanger 12 along highway $HW_{iA}$, through crosspoint AB to highway $HW_{oB}$, and along highway $HW_{oB}$ to output interchanger 14'. Of course, signals in other time slots on highway $HW_{iA}$ may be carried to other crosspoints for transmission along other output highways.

Figure 2:
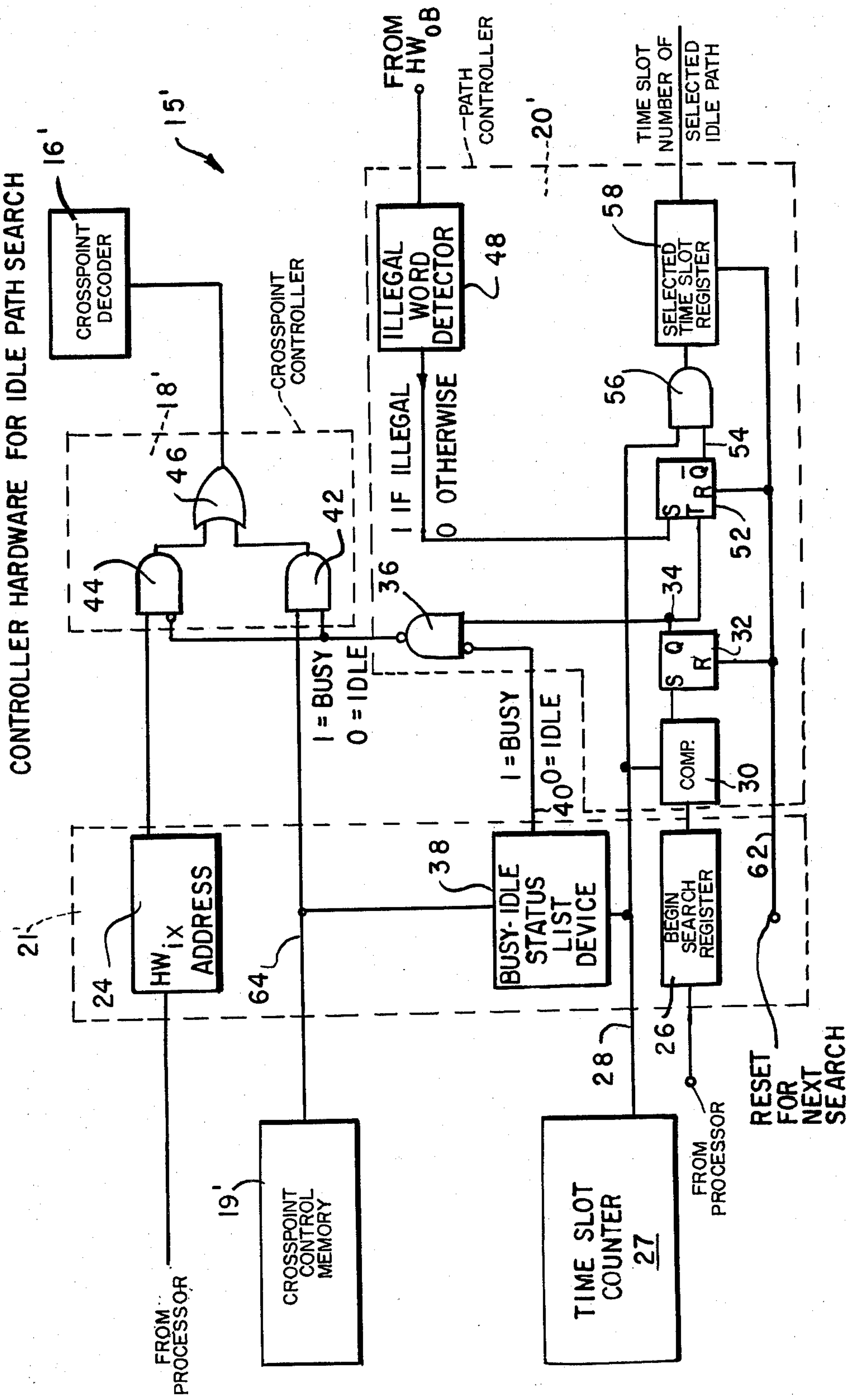
FIG. 2 is a more detailed schematic of the embodiment in the system shown in FIG. 1.

Continuing the example, FIG. 2 shows detail of the set of control devices at 15' controlling crosspoint AB selected in the above example. The associated input control device 21' receives in storage register 24 from a processor a signal identifying the crosspoint to be closed, in the example, crosspoint AB. The processor also provides to a register 26 in the input control device the number of a time slot on the output highway from which to begin searching for a selectable, idle time slot. A counter 27 counts output highway time slots and provides a signal on line 28 identifying successive time slots on the output highway to the input control device and path controller 20'.

A comparator 30 in the path controller compares the number of the time slot from which to begin in the register 26 with each successive time slot identified on line 28 and, upon coincidence, sends an output signal to a set-reset flip-flop 32. The signal complements the flip-flop to its set condition to provide a logic one signal to an output port 34. The signal from port 34 is provided to an AND gate 36 to enable the gate.

Each successive time slot number on line 28 is also provided to a device 38 in the input control containing a preprogrammed list of the busy or idle status of each time slot on the output highway. The device 38 may, for example, be a known random access memory. Each time slot number complements the device 38 to successively present to an output port 40 a signal representing the preprogrammed busy or idle status of the successive time slots on the output highway. Specifically, the device 38 presents a logic zero signal at port 40 for a selectable, idle time slot and a logic one, for a non-selectable, busy time slot. The signal at the port 40 is carried to the AND gate 36 to trigger a logic zero signal from the enabled gate only with each successive time slot signalled as idle by device 38.

The signal from gate 36 disables a connected AND gate 42, but enables another connected AND gate 44 both gates being in the crosspoint controller 18'. Gate 44 then passes the signal identifying the selected crosspoint, here crosspoint AB, from register 24 through OR gate 46 to the crosspoint decoder 16'. The decoder then closes the crosspoint during the idle output highway time slot.

Each selectable or idle time slot on only the input highway is encoded by the input interchanger with a signal which cannot appear in a non-selectable, busy time slot. For example, where the time slots carry digital information including a lead bit logic one, an idle and therefore selectable time slot on the input highway may be encoded with a logic zero lead bit or, alternatively, an all logic zero signal. This encoded signal is conveniently called an illegal word.

An illegal word detector 48 in the path controller 20' is coupled to the output highway. It detects an illegal word carried to the output highway through the closed crosspoint if the input highway time slot during which the crosspoint closes happens to be idle. The detector may be a known comparator comparing the signal in each output highway time slot with a pre-programmed sample of the illegal word. The detector provides a logic one signal only for each detected illegal word. This signal then indicates an idle time slot on both the input and output highways.

In the preferred embodiment of the path controller, the illegal word detector logic one signal indicating selected, idle time slots is provided to a flip-flop 52. The flip-flop also communicates with the port 34 of flip-flop 32 to be enabled only after the logic one signal at port 34 signals the beginning of a search for an idle time slot. The signal from detector 48 then complements flip-flop 52 to provide a logic one signal at the output port 54; this signal enables an AND gate 56. The AND gate 56 also receives the output highway time slot identifying signal from line 28. When enabled it provides the time slot identifying number to a register 58. The register stores the number of the selected time slot from line 28 for later use by the input control device, if desired.

As indicated the input control device may make desired use of the output highway time slot identifying number stored in register 58. Since the presence of a number in the register indicates only an idle time slot, the input control preferably terminates further search for an idle time slot upon detecting a number in the register. It then provides a reset signal to line 62. This line communicates with flip-flop 32, flip-flop 52 and register 58 to reset the flip-flops and erase the register with a reset signal. The path controller is thus returned to its initial condition in preparation for the selection of another time slot. Also preferably the input control supplies the number of the selected output highway time slot from the register to the device 38 to update the list of selectable time slots to reflect the selection of the time slot indicated in register 58. In these functions the input control basically performs known marker functions well understood by those in the art. Accordingly no further explanation of these functions need be given.

Figure. It will be understood that the specific sequence of operations described with reference to the Table is merely exemplary of the many possible sequences of operation of the embodiment, each specific sequence of operation depending upon the variable combinations of busy and idle time slots on the input and output highways.

Table I

| Output Highway $HW_{oB}$ Time Slot | Listed Status at port 40 | Begin Search at port 34 | Busy - Idle if searching at Gate 36 | To Decoder from gate 44 | To Decoder from gate 42 | Input Highway time slot signal | Illegal Word Detector Signal |
|---|---|---|---|---|---|---|---|
| 0 | 1(busy) | 0(no) | 1(no search) | 0 | 0 | — | 0 |
| 1 | 0(idle) | 0 | 1 | 0 | 0 | — | 0 |
| 2 | 1 | 0 | 1 | 0 | NB | 111($HW_{iN}$) | 0 |
| 3 | 1 | 0 | 1 | 0 | BB | 101($HW_{iB}$) | 0 |
| 4 | 1 | 1(yes) | 1(busy) | 0 | 0 | — | 0 |
| 5 | 1 | 1 | 1 | 0 | BB | 110($HW_{iB}$) | 0 |
| 6 | 0 | 1 | 0(idle) | AB | 0 | 111($HW_{iA}$) | 0 |
| 7 | 0 | 1 | 0 | AB | 0 | 000($HW_{iA}$) | 1 |

A brief description of the function of the decoder 16' will also sufficiently explain its operation for those skilled in the art. As earlier described the decoder controls closing the crosspoints which, of course, may be relays or other known switching devices. Preferably the decoder is a known special purpose digital device, for example, a data multiplexer designated SN54150-T1 and available from Texas Instruments Corporation. This device has a port for receiving crosspoint addresses from gate 46, a port for connection to an output highway, crosspoints and a plurality of ports for connection to the input highways. Thus, it may be used for each illustrated decoder and crosspoint column.

When gate 44 is enabled with an idle time slot signal from device 38, the signal identifying the crosspoint to be closed is carried from register 24 to the decoder. The decoder then closes the identified crosspoint to close a path from the input to the output highway during the time slot signalled from device 38. However, if the device 38 signals that a time slot is busy, a high logic level signal appears at the output of gate 36. This signal inhibits gate 44 but enables gate 42. Gate 42 receives a signal over line 64 from the crosspoint control memory device identifying a crosspoint, if any, earlier selected to be closed during that time slot. Enabled gate 42 carries this signal to the decoder for closing the crosspoint. Of course, the signals on line 64, from, for example, a preprogrammed list of addresses of crosspoints to be closed in the memory are presented with the time slots on the highways. Unique time slot paths are thus established in the decoder between selected input and output highways.

Each of the components illustrated in the figures is commercially available. Specific components are selected from those so available for proper design to carry out the functions described as well understood by those in the art. Although some devices are described as preferred it will be understood that alternatives having the described functions are intended to be within the scope of the invention.

OPERATION OF THE PREFERRED EMBODIMENT

Having now described a preferred embodiment of the invention, an example of its operation can be described with particular reference to Table I below and FIG. 2 illustrating the set of control devices 15' earlier selected as exemplary of the other sets and shown in the Figure.

The Table identifies successive output highway time slots as identified on line 28 in accordance with the time slots on the highway, in this example $HW_{oB}$. It is assumed that the output highway time slot from which it is desired to begin a search for an idle time slot is time slot 4; the number of this time slot is entered in register 26. No preceding output highway time slot will be selected.

Then, for example, the first output highway time slot, numbered zero, is listed in device 38 as busy to provide a busy-indicating logic one signal at the port 40 of the device. Since the search is not to begin until time slot number 4, the comparator 30 is not satisfied and does not complement flip-flop 32. The flip-flop then provides a logic zero signal at port 34. Gate 36 is then unsatisfied and provides a logic one signal, now indicating the search has not begun, to the gates 42 and 44. Gate 44 is disabled by this signal to provide a logic zero to the decoder. Gate 42 is enabled; however, it is assumed that no crosspoint address is delivered to the gate over line 64. Since the gates then provide logic zeroes to the decoder, it closes no crosspoint. Since no crosspoint closes, no signal will be carried from the input highway to the output highway. Since no signal was carried to the output highway, the illegal word detector cannot detect an illegal word and provides a logic zero signal shown in the Table to flip-flop 52. This signal indicates that the time slot is not selected. The flip-flop 52 is not complemented by this signal, gate 56 is not enabled and no time slot identifying signal is entered in register 58 as earlier described Since the crosspoints identify the one of the input highways to be connected to the output highway, an absent crosspoint address identifies none of the input highways for which the time slot signal may be shown. The input highway time slot column of the Table is therefore blank. This condition may readily arise if the signals in the time slots on each input highway are intended for a different one of the output highways from $HW_{oB}$ considered in this example. It should also be kept in mind that the input and output highway time slots are coincident at each crosspoint. Selecting a time slot on one highway during which a crosspoint closes therefore selects the coincident time slot on the other highway.

Time slot 1 is next identified on line 28. This time slot is listed in device 38 as idle to provide a logic zero signal at port 40. However, the comparator 30 is still unsatisfied, the time slot 4 having been selected for beginning the search, and flip-flop 32 continues to provide the logic zero signal at port 34 to disable the gate 36. Again, gate 36 provides a logic one signal indicating that search has not begun to gates 42 and 44. Gate 42 is enabled but, as before, no crosspoint is identified for closing. Similarly, gate 44 is disabled to block the crosspoint address in register 24. Then, as before, no crosspoint closes, no signal is carried to the output highway, and the illegal word detector cannot detect an illegal word for selecting the time slot.

Time slot 2 is then identified on line 28 but, again, the comparator is not satisfied and gate 36 provides a logic one signal to the gates 42 and 44. Gate 44 then continues to be disabled to block the crosspoint address in register 24, while gate 42 is again enabled. This time, however, line 64 receives from the crosspoint control memory device a signal identifying a crosspoint, for example, crosspoint NB. The actual identification signal is, of course, digitally encoded, but is shown in the table by the crosspoint designation shown in FIG. 1. As an example of such crosspoint identification encoding, successive crosspoints down the column may be numbered in binary. Since gate 42 is enabled, the crosspoint address is carried through the gate and through gate 46 to the decoder which closes the crosspoint to form a signal-carrying path from the input highway to the output highway during the time slot. The time slot on the input highway $HW_{iN}$ connected to the crosspoint is shown to have a call signal then carried through the crosspoint to the illegal word detector on the output highway. The illegal word detector 48 determines that the call signal is not an illegal word to provide a logic zero signal, as before.

The call signal is shown in the Table as a three bit word at least one bit of which is a logic one. This call signal word is merely illustrative of potential call signals both in bit content and in the number of bits. The specific bit content depends, of course, on the content of the call signal, while the number of bits is selected as part of the system design, seven and eight-bit words being more common in telephone systems.

Time slot 3 next successively appears on the line 28 and again fails to satisfy the comparator 30. Flip-flop 32 then continues to provide a low logic level signal to flip-flop 52 which then continues to be disabled. Device 38 lists the status of the output time slot as busy leading, as before, to the enablement of gate 42 and the disablement of gate 44. The input control now provides to line 64 a signal identifying crosspoint BB. This signal is carried to the decoder which closes the crosspoint between input highway $HW_{iB}$ and the output highway $HW_{oB}$. The call signal from the input highway is then carried on the output highway to the illegal word detector which, again, fails to detect an illegal word.

It is additionally observed that the time slot on another input highway, for example $HW_{iA}$, coinciding with the time slot 3 on the output highway may have been idle. However, the crosspoint connecting the input highway $HW_{iA}$ to the output highway was not closed and the illegal word therefore not carried to the output highway, no more than one crosspoint being closed during each time slot. It may also be observed that the continued disablement of flip-flop 52 by the logic zero signal from flip-flop 32 will block all time slot identifying numbers from register 58. Thus, even if the illegal word detector were to detect an illegal word, the number of the time slot during which the illegal word is detected will still be blocked from register 58 by gate 56. The appearance of an illegal word at the detector represents an anomaly in the system. For example, the decoder may malfunction to close the wrong crosspoint. The detection of an illegal word while flip-flop 52 is disabled then provides one check on the operation of the apparatus.

Time slot 4 is then identified on line 28. The comparator now detects a match between the time slot number from which to begin search in register 26 and that on the line 28. The comparator then complements flip-flop 32 to provide the logic one signal at port 34. This signal enables both gate 36 and flip-flop 52. However, as shown in the Table, the device 38 identifies time slot 4 as busy to again provide a logic one signal from the gate 36, now indicating that search has begun, but that the output highway time slot is busy. Although gate 42 is enabled it provides a logic zero signal to the decoder because no crosspoint identifying number appears on line 64. Gate 44 is disabled to block the crosspoint address in register 24. The decoder then closes no crosspoint and no illegal word can be carried to the detector 48.

Time slot 5 is then identified on line 28. The comparator does not reset the flip-flop 32, which is stable in the state with a logic one at output port 34 until reset by a signal on the line 62. Again, the device 38 identifies the time slot as busy to enable gate 42 and disable gate 44. This time gate 44 identifies a crosspoint BB to be closed by the decoder. The crosspoint carries an input highway call signal to the output highway and the illegal word detector fails to detect an illegal word.

Time slot 6 then appears on line 28 and is identified in the device 38 as idle. A logic zero then appears at port 40 to provide a logic zero from gate 36. The logic zero signal from gate 36 disables gate 42, but enables gate 44, which then passes the crosspoint address stored in register 24 to the decoder. As shown in the Table, the address is crosspoint AB selected in the earlier example. This crosspoint is then closed by the decoder. However, the time slot on the input highway $HW_{iA}$ connected to the crosspoint carries a call signal. The illegal word detector determines the call signal is not an illegal word and continues to provide the logic zero signal to flip-flop 52 which continues to provide the logic zero signal to flip-flop 52 which continues to disable gate 56, blocking the time slot number from the register 58.

The next time slot, number 7, is then identified on the line 28 and is again signalled as idle with a logic zero signal at the port 40 of device 38. Again, gate 42 is disabled and gate 44 enabled to pass the crosspoint address to the decoder. Crosspoint AB again closes, this time to carry an illegal word, here designated 000, to the output highway. The illegal word detector detects the illegal word to provide a logic one signal to flip-flop 52. The flip-flop is complemented to enable gate 56 which then passes the time slot identifying number 7 to the register 58.

The operation thus described also illustrates three particular features of the invention. Firstly, if it is assumed that there is at least one pair of idle time slots on the input and output highways, the idle path selection will be assured within one frame of time slots. In the prior art, selection of time slots was not so assured within one frame. Selection of a time slot within one frame desirably minimizes the delay in selecting of idle time slots. Secondly, the closing of a crosspoint to carry the illegal word from the input highway to the output highway not only minimizes processor interfacing data signals to the interchangers, but also provides a partial test of the crosspoints. If a crosspoint fails to close when commanded by the decoder, an illegal word cannot be carried from the input highway to the output highway and the detector cannot detect an illegal word. The malfunctioning crosspoint will then not be selected, thus creating a partial test of the signal-carrying continuity of the crosspoints. Thirdly, the time slot selection was carried out independently by each set of control devices in the TST network and remote from the processor. Data interfacing with the processor and use of processor time are then minimized.

Having thus described my invention what I desire to secure by Letters Patent of the United States is:

1. A pathfinding method of selecting time slots in cyclically recurring frames for a signal path between two selected lines of a digital switching network in which a list in status memory means indicates the busy or idle status of each time slot on one of said selected lines and in which available idle time slots on only the other of said selected lines are encoded with a signal indicating the availability of the time slots, the steps of:

identifying the busy or idle status of each time slot on said one line from the list in said status memory means;

enabling switching means to provide a signal path between said selected lines during each time slot identified as available on said one line for carrying signals between the lines;

detecting an encoded signal carried to said one line from said other line for indicating a time slot available on both of said selected lines; and registering the identity of the last said time slot for use by a processor.

2. A pathfinding method of selecting time slots in cyclically recurring frames for a signal path between selected input and output lines of a network in which available idle time slots on only the input line are encoded with a signal indicating the availability of the time slots and in which a list in status memory means indicates the busy or idle status of each time slot on the output line, the steps of:

identifying the busy or idle status of each output line time slot from said list;

enabling switching means to provide a signal path between the input line and the output line during each time slot identified as idle on said output line for carrying signals on the input line to the output line;

detecting an encoded signal carried to the output line from the input line for indicating a time slot available on both said input and said output line; and registering the identity of the last said time slot.

3. A method as in claim 2 wherein the step of detecting an encoded signal additionally comprises the step of partially testing the continuity of the established signal carrying path.

4. In a method of selecting idle time slots in cyclically recurring frames for a call signal path between input and output highways of a telephone system in which idle time slots on only the input highway are encoded with an illegal word indicating idle time slots and in which a list in a status memory indicates the busy or idle status of each time slot on the output highway, the steps of:

successively identifying the busy or idle status of output highway time slots from said list;

enabling gate means to provide a signal path between the input highway and the output highway during each time slot identified as idle for carrying signals on the input highway to the output highway;

detecting illegal words carried to the output highway from the input highway for indicating an idle time slot on both said input and said output highway; and registering the identity of the last said time slot for use in establishing a call connection.

5. A method as in claim 4 wherein the step of detecting an illegal word additionally comprises the step of partially testing the continuity of the established signal carrying path.

6. A method as in claim 4 wherein the telephone system comprises input highways and output highways and means selecting an input and an output highway for each call signal and wherein the step of detecting illegal words is independent for each output highway.

7. In a method of selecting idle time slots in cyclically recurring frames on a selected one of a plurality of input highways and a selected one of a plurality of output highways in a network of highways in a telephone system in which idle time slots on only the input highways are encoded with an illegal word and in which lists in status memory means indicate the time slots which have an idle status on each one of the output highways, the steps of:

successively identifying the idle status of time slots on the selected output highway from said list in the status memory means for the selected output highway independently of the lists for each other output highway;

enabling means to provide a signal path between the selected input highway and the selected output highway during the time slots identified as idle status for carrying signals on the selected input highway to the selected output highway;

detecting illegal words carried to the output highway from the input highway for indicating an idle status time slot on both the selected input highway and the selected output highway, and for partially testing the continuity of the enabled signal carrying path;

identifying the last said time slot; whereby an available time slot is selected within one frame.

8. Pathfinding apparatus for selecting time slots in cyclically recurring frames for a signal path between two selected lines of a digital switching network, having status memory means for listing the busy or idle status of each time slot on one of said selected lines and having means for encoding available idle time slots on only the other of said selected lines with a signal indicating the availability of the time slots, a control comprising:

means responsive to the listing in said status memory means for identifying the busy or idle status of each time slot on said one line;

means including switching means enabled to provide a signal path between said selected lines during each time slot identified as idle on said one line for carrying signals between the lines; and means detecting an encoded signal carried to said one line from said other for indicating a time slot available on both of said selected lines, and means to register the identity of the last said time slot for use by processing apparatus.

9. In a path finding apparatus for selecting idle time slots in cyclically recurring frames for call signals between input and output highways of a telephone system having means encoding idle time slots on only the input highway with an illegal word indicating idle time slots and having status memory means listing the busy or idle status of each time slot on the output highway, a control comprising:

identification means connected to said status memory means responsive to the listing in said status memory means for successively identifying the busy or idle status of output highway time slots;

interconnection means including switching means connected to said identification means, said switching means being enabled to provide a signal path for carrying signals between the input highway and the output highway during the time slots identified as idle by said identification means;

detection means connected to said output highway for detecting illegal words carried to the output highway, via said signal path, from the input highway so as to indicate a common time slot available on both the input and output highway; and register means, connected to said detection means, to register the identity of the last said common time slot for use by a processor to establish a call connection.

10. Apparatus as in claim 9 wherein said detection means additionally comprises means for partially testing the continuity of the signal path established by said interconnection means.

11. Apparatus as in claim 9 including additional input highways and additional output highways and further including means for selecting a single input and output highway pair for each call signal and wherein said detection means is independent for each output highway.

12. In a pathfinding apparatus for use with a time division multiplex switching network having input means coupled to an input highway, an output highway coupled to output means, having established calls between said input means and output means, a switching device between said input highway and said output highway, each established call having an assigned time slot in cyclically receiving frames during which said input means is actuated to place said established calls, in the form of digital signals on said input highway, said switching device is enabled to pass said digital signals from said input highway to said output highway, and said output means is actuated to receive said digital signals from said output highway; wherein the improvement comprises first means connected to said input means for causing said input means to encode idle time slots on said input highway with an illegal word and control means comprising status memory means for storing the busy or idle status for each time slot on said output highway, scanning means, connected to said status memory means, for scanning the time slots of a frame, including identification means effective during each time slot to read the busy or idle status from said status memory, path set up means connected to said scanning means responsive to an idle status to enable said swithcing device to pass digital signals from said input highway to said output highway, an illegal word detector coupled to said output highway which responsive to an illegal word supplies a path found signal, and means responsive to said path found signal, connected to said illegal word detector to register the identity of the current time slot as being selected for use by a processor.

13. Pathfinding apparatus as set forth in claim 12, wherein there is at least one additional input means and input highway, at least one additional output highway and output means, at least one additional switching device coupling each of said additional input highways to each of said additional output highways;

wherein each output highway has an individual said control means, each said control means further including a storage register in which is stored the identity of a selected input highway, and said path setup means includes first gate means to gate said identity of said selected input highway from said storage register to identify the switching device to be enabled.

14. Pathfinding apparatus as set forth in claim 13, wherein for each said output highway there is a switching control memory storing the identity of the input highway being used by the call for each busy time slot on the last said output highway, and further gate means enabled during busy time slots to supply the identity of the switching device to be enabled, said further gate means being inhibited when said first gate means is enabled.

15. Pathfinding apparatus as set forth in claim 14, wherein each said control means includes a register for storing the identity of the time slot from which said scanning it to start, and means to inhibit the said first gate means until the occurrence of the last said time slot.

16. Pathfinding apparatus for use with a switching network for calls having time division multiplexed digital signals, said switching network having a plurality of input highways, a plurality of output highways, a plurality of crosspoints coupling each input highway to each output highway, and wherein a path for a call is provided by enabling the crosspoint between one of said input highways and one of said output highways during a selected time slot of cyclically recurring frames, input means placing digital signals for said call on the input highway of said path during said selected time slot, and output means receiving said digital signals for said call from the output highway of said path during said selected time slot of each frame;

a new call having a selected input highway and a selected output highway with a selected crosspoint coupling said selected input highway to said selected output highway;

said pathfinding apparatus comprising means to encode with an illegal word each idle time slot on said selected input highway, and control means individual to each of said output highways;

said control means comprising a status memory which stores the busy-idle status of each time slot for said selected output highway, a storage register which stores the identity of said selected input highway, scanning means connected to said status memory to read said memory during each time slot, means connected to said storage register operative responsive to an idle indication from said status memory to use the identity stored in said storage register to enable said selected crosspoint for the current time slot, an illegal word detector coupled to said output highway to detect said illegal word, and means responsive to detection of said illegal word to register the identity of the current time slot as being selected for said new call for use by a processor.

* * * * *

UNITED STATES PATENT AND TRADEMARK OFFICE
CERTIFICATE OF CORRECTION

PATENT NO. : 3,912,871

DATED : October 14, 1975

INVENTOR(S) : Frank E. Battocletti

It is certified that error appears in the above-identified patent and that said Letters Patent are hereby corrected as shown below:

Column 12, line 27, "it" should be -- is --.

Signed and Sealed this

*second* Day of *March 1976*

[SEAL]

*Attest:*

RUTH C. MASON
*Attesting Officer*

C. MARSHALL DANN
*Commissioner of Patents and Trademarks*